United States Patent [19]

Kato

[11] Patent Number: 5,693,884
[45] Date of Patent: Dec. 2, 1997

[54] SEMICONDUCTOR ACCELERATION SENSOR

[75] Inventor: Hajime Kato, Tokyo, Japan

[73] Assignee: Mitsubishi Denki Kabushiki Kaisha, Tokyo, Japan

[21] Appl. No.: 680,026

[22] Filed: Jul. 15, 1996

[30] Foreign Application Priority Data

Jan. 18, 1996 [JP] Japan ................... 8-006454

[51] Int. Cl.⁶ ................... G01P 15/12
[52] U.S. Cl. ................... 73/514.33
[58] Field of Search ........... 73/514.33, 514.36, 73/514.37, 862.382, 514.16; 338/2, 5

[56] References Cited

U.S. PATENT DOCUMENTS 4,825,696  5/1989  Seipler ................... 73/514.33
5,351,542  10/1994  Ichimura et al. ................... 73/514.33

FOREIGN PATENT DOCUMENTS 4099964  3/1992  Japan.

*Primary Examiner*—John E. Chapman
*Attorney, Agent, or Firm*—Leydig, Voit & Mayer, Ltd.

[57] ABSTRACT

A semiconductor acceleration sensor includes a substrate, a semiconductor sensor chip with a diaphragm and having one end fixed to a pedestal, the pedestal including at least one thick film layer and disposed on the substrate, and a protrusion of at least one thick film layer on the substrate directly opposite a free end of the sensor chip, shorter than the pedestal. The protrusion protects the semiconductor sensor chip from breakage at the diaphragm due to impacts.

11 Claims, 3 Drawing Sheets

SEMICONDUCTOR ACCELERATION SENSOR

FIELD OF THE INVENTION

The present invention relates to a semiconductor acceleration sensor particularly used for ABS (Antilock Brake System) or SRS (Supplement Restraint System, i.e., Air Bag System) of an automobile. The acceleration sensor comprises a sensor chip, with a strain sensor formed on or in a semiconductor substrate, in a cantilever structure with one of its ends being fixed, and produces an electrical signal corresponding to the change in resistance of the strain sensor.

DESCRIPTION OF THE PRIOR ART

FIG. 3 is a partial cross section showing the internal structure of a conventional semiconductor acceleration sensor. As shown in FIG. 3, a semiconductor acceleration sensor 50 comprises a sensor chip 53, one end of which is adhered to a pedestal 52 to form a cantilever structure. The pedestal, made of laminated thick film layers, is formed on the surface of a ceramic substrate 51. The thick film layers formed on ceramic substrate 51 and chip sensor 53 are protected with a resin package 54 in the shape of a container. The resin package covers the front surface of ceramic substrate 51 on which the thick film layers and sensor chip 53 are placed and is adhered to the ceramic substrate with an adhesive 55. The other end of sensor chip 53 is not fixed and is free to move.

A diaphragm 56 is formed on sensor chip 53 by etching the back side thereof. An acceleration detector 57 is formed, on the front side of the diaphragm, with four resistors (referred to as the piezo resistors hereinafter) in a bridge circuit which exhibit the piezo effect. This structure allows the stress to concentrate on the piezo resistors. When acceleration is produced on a sensor chip 53, a force is exerted on its free end and the sensor bends at the diaphragm 56 where a strain is generated. The resistance of each piezo resistor changes according to the magnitude of the acceleration and conversely the acceleration is obtained from the variation of the resistance.

The space between sensor chip 53 and ceramic substrate 51 is typically 10–20 μm. If any dust or foreign particles exist in the space, the displacement of the free end of sensor chip 53 is limited, and the acceleration produced on semiconductor acceleration sensor 50 is not correctly measured. One solution is to make pedestal 52 higher, 50 μm for example, so that even if any dust or foreign particles exist in the space, the displacement of the free end of sensor chip 53 is not limited.

This modification eliminates a restriction on the displacement of the free end of sensor chip 53. Therefore, if semiconductor acceleration sensor 50 experiences a large impact, such as a fall, sensor chip 53 sometimes breaks at the diaphragm 56. One measure to overcome this difficulty has been proposed (Japanese Patent Laid-Open Publication HEI-4-99964). This method uses an impact assimilation material disposed on ceramic substrate 51, just underneath the free end of sensor chip 53, so that the displacement of the free end of sensor chip 53 toward the ceramic substrate 51 is limited. Further another impact assimilation material is disposed on the inner side of package 54 just above the free end of sensor chip 53, so that the displacement of the free end of sensor chip 53 toward the package 54 is also limited.

This structure prevents the breakage of sensor chip 53 even if a large impact is produced on semiconductor acceleration sensor 50. However, in order to maintain the accuracy of the space between sensor chip 53 and each of the impact assimilation materials, the impact assimilation materials must be accurately manufactured and the cost for accurately manufacturing the impact assimilation materials is high. Further, the required accurate disposition of the impact assimilation materials on ceramic substrate 51 and package 54 just beneath and above the free end of sensor chip 53 results in an increase in the number of processes, a decrease in the production efficiency, and an increase in the production cost.

SUMMARY OF THE INVENTION

Therefore an object of the present invention is to solve the above problems and provide a low cost semiconductor acceleration sensor which can accurately measure acceleration regardless the existence of dust or a foreign particle and which does not break at the sensor chip even if a large impact is produced on the semiconductor acceleration sensor.

The present invention provides a semiconductor acceleration sensor comprising a semiconductor sensor chip with a diaphragm formed therein, one end of the semiconductor sensor chip being fixed on a pedestal made of at least one thick film layer on a substrate in order to form a cantilever structure. The semiconductor acceleration sensor detects acceleration from the deformation of the diaphragm. The present invention also provides a semiconductor acceleration sensor comprising (a) a sensor portion including a semiconductor sensor chip with a diaphragm formed therein, one end of the semiconductor sensor chip being fixed on a pedestal made of at least one thick film layer on a substrate in order to form a cantilever structure, and (b) a resin package having the shape of a container, covering over and protecting the sensor portion. This semiconductor acceleration sensor also detects acceleration from the deformation of the diaphragm. Further, either of the above semiconductor acceleration sensors is characterized by a protrusion made of at least one thick film layer on the substrate in order to limit the deflection of the free end of the sensor chip toward the substrate. The protrusion, which is shorter than the pedestal, is formed in the position just underneath the free end of the sensor chip at the same time and by the same process as the pedestal is formed on the substrate.

More specifically, the aforementioned protrusion is formed in laminated thick film layers of electrical insulation glass and electrical conductor. The gap between the sensor chip and the protrusion is in the range between 10 and 100 mm.

The aforementioned resin package has a projecting portion for limiting the deflection of the free end of the sensor chip toward the resin package. The projecting portion is formed in one piece with the resin package. The gap between the sensor chip and the projecting portion is within the range of 10–100 μm.

Thus, even if an excessive impulse acts on the sensor chip in such a case as the semiconductor acceleration sensor falls on the ground, the protrusion and/or the projecting portion prevent the breakage of the sensor chip by limiting the deflection of the free end of the sensor chip. The protrusion can be formed with precision in position and dimension at the same time and by the same process as the pedestal is formed in thick film layers on the substrate. The gap between the sensor chip and the protrusion can also be controlled accurately within the range of 10–100 μm. Hence even if any dust or foreign particles exist in the gap, the dust or the foreign particles do not limit the degree of the deflection of the free end of the sensor chip.

The projecting portion can be formed in one piece with the resin package. Further, the position where the projecting portion is formed and the dimensions of the projecting portion can be controlled relatively accurately. The gap between the sensor chip and the projecting portion within the range of 10–100 μm can also be controlled relatively accurately. Hence even if any dust or foreign particles come into the gap, the dust or the foreign particles do not limit the degree of the deflection of the free end of the sensor chip. Thus, the semiconductor acceleration sensor of the present invention can accurately measure acceleration regardless the existence of a dust or a foreign particle, does not break even if an excessive impulse acts on it, and can be produced with only a small additional material cost without adding any extra processes.

BRIEF DESCRIPTION OF THE DRAWINGS

These and other objects, features and advantages of the present invention will become clear from the following description taken in conjunction with the preferred embodiment with reference to the accompanying drawings, and in which.

DETAILED DESCRIPTION OF THE PREFERRED EMBODIMENT

The embodiments of the present invention will be described below in detail with reference to the accompanying drawings.

Figure 1:
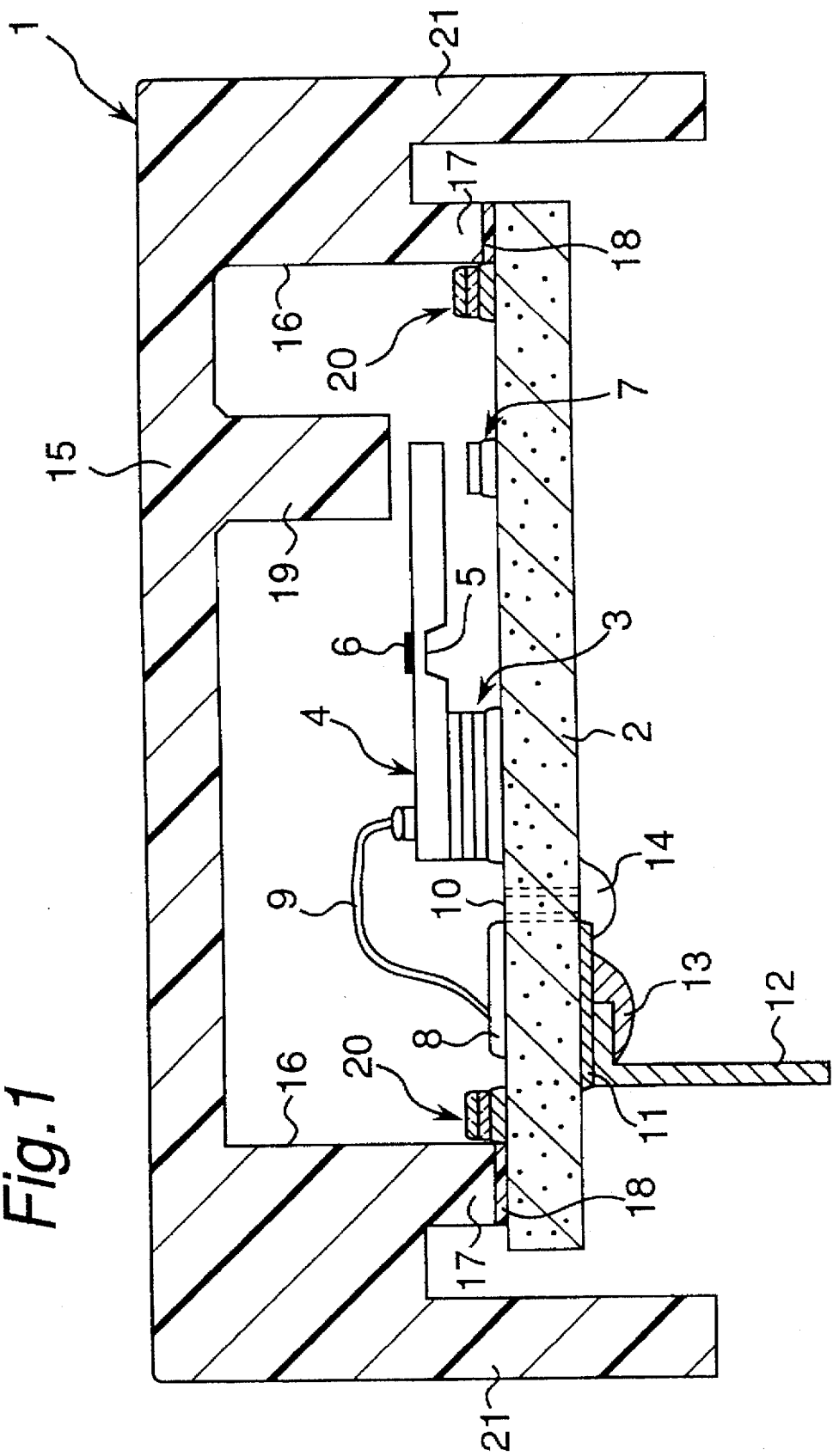
FIG. 1 is a partial cross section showing the internal structure of the semiconductor acceleration sensor of eEmbodiment 1 of the present invention.

FIG. 1 is a partial cross section showing the internal structure of a semiconductor acceleration sensor according to the present invention. In FIG. 1, a semiconductor acceleration sensor 1 comprises a sensor chip 4, one end of which is fixed to a pedestal 3 to form a cantilever structure, the pedestal being formed with laminated thick film layers on a ceramic substrate 2 made of alumina, for example. The side of the ceramic substrate, where pedestal 3 for installing sensor chip 4 is mounted, is referred to as the mounting side and the other side is referred to as the nonmounting side hereinafter.

Sensor chip 4 may be made of an N-type silicon single crystal. Sensor chip 4 has a diaphragm 5 formed by etching its back side (facing ceramic substrate 2) and four resistors on the front side at the diaphragm formed by thermal diffusion or the ion implantation of P-type impurities such as boron. These resistors exhibit the piezo effect and are referred to as piezo resistors hereinafter. The piezo resistors form a bridge circuit to make an acceleration detector by means of diffusion wiring formed by high concentration doping with P-type impurities or by means of aluminum wiring formed by vacuum deposition. This structure allows the strain to concentrate on the piezo resistors.

A protrusion 7 is formed with laminated thick films on the mounting side of ceramic substrate 2 and underneath the free end of sensor chip 4. These thick films are formed by the same process as is pedestal 3. Protrusion 7 limits the amount of deflection of the free end of the sensor chip. Further, a gold electrode 8 is formed with a gold thick film on the mounting side of ceramic substrate 2 and is connected to sensor chip 8 by a bonding wire 9.

A through hole 10 is bored in ceramic substrate 2 and the wall of the through hole is coated with a conductor. The conductor and gold electrode 8 have an electrical contact. Further, a thick film conductor 11 is formed on the non-mounting side of ceramic substrate 2 and connected to the conductor of through hole 10. A lead terminal 12 in the shape of the letter L is soldered to thick conductor 11 with solder 13. Accordingly, gold electrode 8 is connected with lead terminal 12 through the conductor of through hole 10 and thick conductor 11. Through hole 10 is covered with resin 14 on the nonmounting side of ceramic substrate 2. In FIG. 1 only one lead terminal is shown for easier understanding. A plurality of lead terminals, however, may be used for the same purpose.

A resin package 15 in the shape of a box with the largest face open and facing down to ceramic substrate 2 covers the mounting side of ceramic substrate 2 to protect it. The inner wall 16 of package 15 is formed to match the periphery of ceramic substrate 2. The end portion 17 of inner wall 16 is fixed with adhesive 18 along the periphery of ceramic substrate 2 so that the inside of semiconductor acceleration sensor 1 is sealed.

A projecting portion 19 is formed on the inner side of package 15 just above the free end of sensor chip 4. The gap between projecting portion 19 and sensor chip 4 is between 10 μm and 100 μm. Projecting portion 19 prevents the breakage of sensor chip 4 at diaphragm 5 when an excessive impulse acts on semiconductor acceleration sensor 1 by limiting the amount of the deflection of the free end of sensor chip 4 toward the package.

Projecting portion 19 can be formed in one piece with resin package 15 when the resin package is molded. The dimensions of projecting portion 19 are poorly controlled compared to those of protrusion 7 because projecting portion 19 is made by molding. For example, suppose the desired gaps between protrusion 7 and sensor chip 4 and that between projecting portion 19 and sensor chip 4 are both 100 μm. The accuracy of the gap between protrusion 7 and sensor chip 4 may be ±15 μm while the gap for projecting portion 19 can be ±50 μm. Thus, although projecting portion 19 can prevent the breakage of sensor chip 4, protrusion 7 can function more effectively. Therefore, it is preferable to make projecting portion 19 simultaneously with protrusion 7.

Package 15 should be fixed on ceramic substrate 2 so that projecting portion 19 is located precisely above the free end of sensor chip 4. A dam 20 is formed on ceramic substrate 2 so that end portion 17 of the inner wall of package 15 is precisely positioned with respect to ceramic substrate 2. Dam 20 may be formed in thick film layers made similarly to pedestal 3 and protrusion 7. Inner wall 16 at end portion 17 fits against dam 20 and end portion 17 is fixed to the substrate with adhesive 18. Thus, projecting portion 19 can be positioned above the free end of sensor chip 4 easily and accurately. Package 15 also has an outer wall 21 outside inner wall 16. Outer wall 21 may be used to raise ceramic substrate 2 from the mounting surface of semiconductor acceleration sensor 1.

Dam 20, formed along the periphery of ceramic substrate 2, prevents adhesive 18 from flowing toward pedestal 3, protrusion 7, and gold electrode 8 formed on ceramic substrate 2. Dam 20 also prevents adhesive 18 from contacting bonding wire 9 and breaking the wire due to the contraction or expansion of adhesive 18 as it cures. Pedestal 3 forms the pedestal portion; sensor chip 4 and acceleration detector 6 form the semiconductor sensor chip; and pedestal 3, sensor chip 4, and acceleration detector 6 form the sensor portion.

FIGS. 2A to 2E show the processes for forming pedestal 3, protrusion 7, gold electrode 8, and dam 20 and for fixing sensor chip 4 to pedestal 3.

Figure 2A:
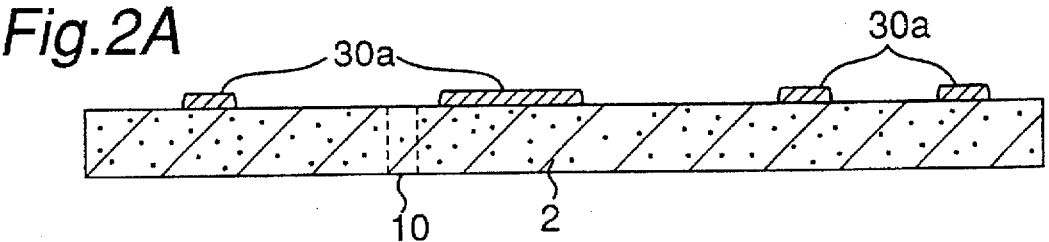
FIGS. 2A, 2B, 2C, 2D and 2E are cross sections illustrating processes for forming sensor chip 4 and protrusion 7 on ceramic substrate 2.
Figure 2B:
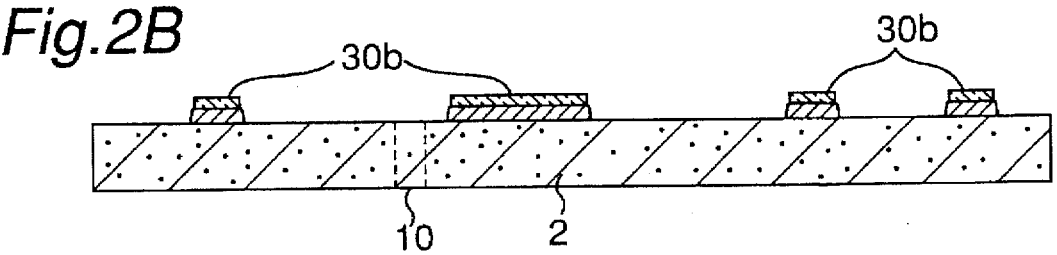
Figure 2C:
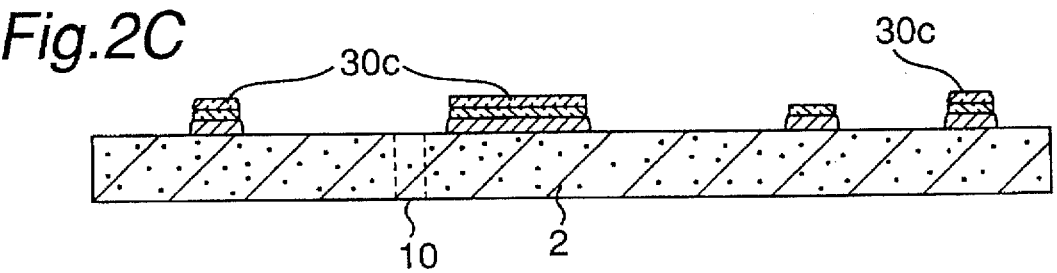

As shown in FIG. 2A a desired pattern is printed with a thick film paste of Ag-Pd or Ag-Pt on the mounting side of ceramic substrate 2, made of alumina, having through hole 10 therein. The printed pattern is dried and heated to form first thick film conductor layers 30a. Next, as shown in FIG. 2B, a thick film paste of insulating glass is applied on top of first thick film layers 30a and dried to make second thick film layers 30b. Then, as shown in FIG. 2C, a thick film paste of insulating glass is applied again on the second thick film layers for pedestal 3 and dam 20, dried, and heated to make second and third thick film layers 30b and 30c.

Figure 2D:
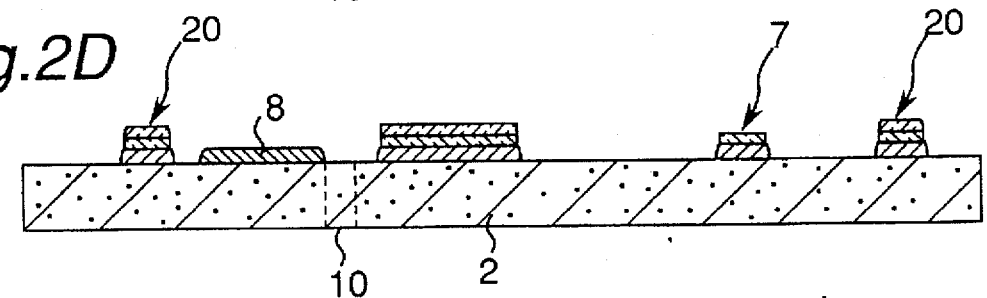
Figure 2E:
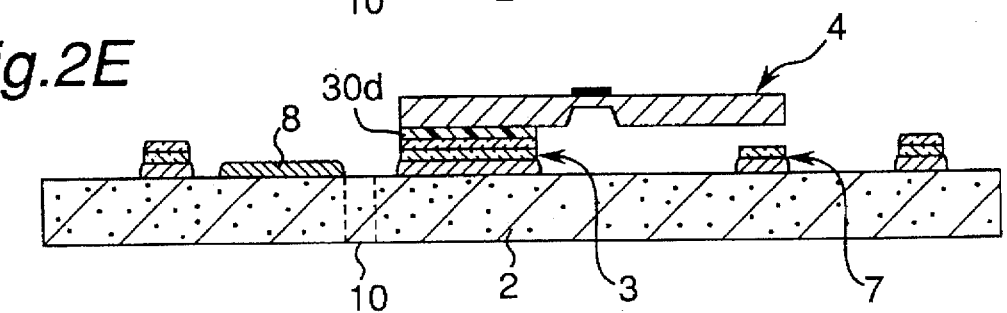
Figure 3:
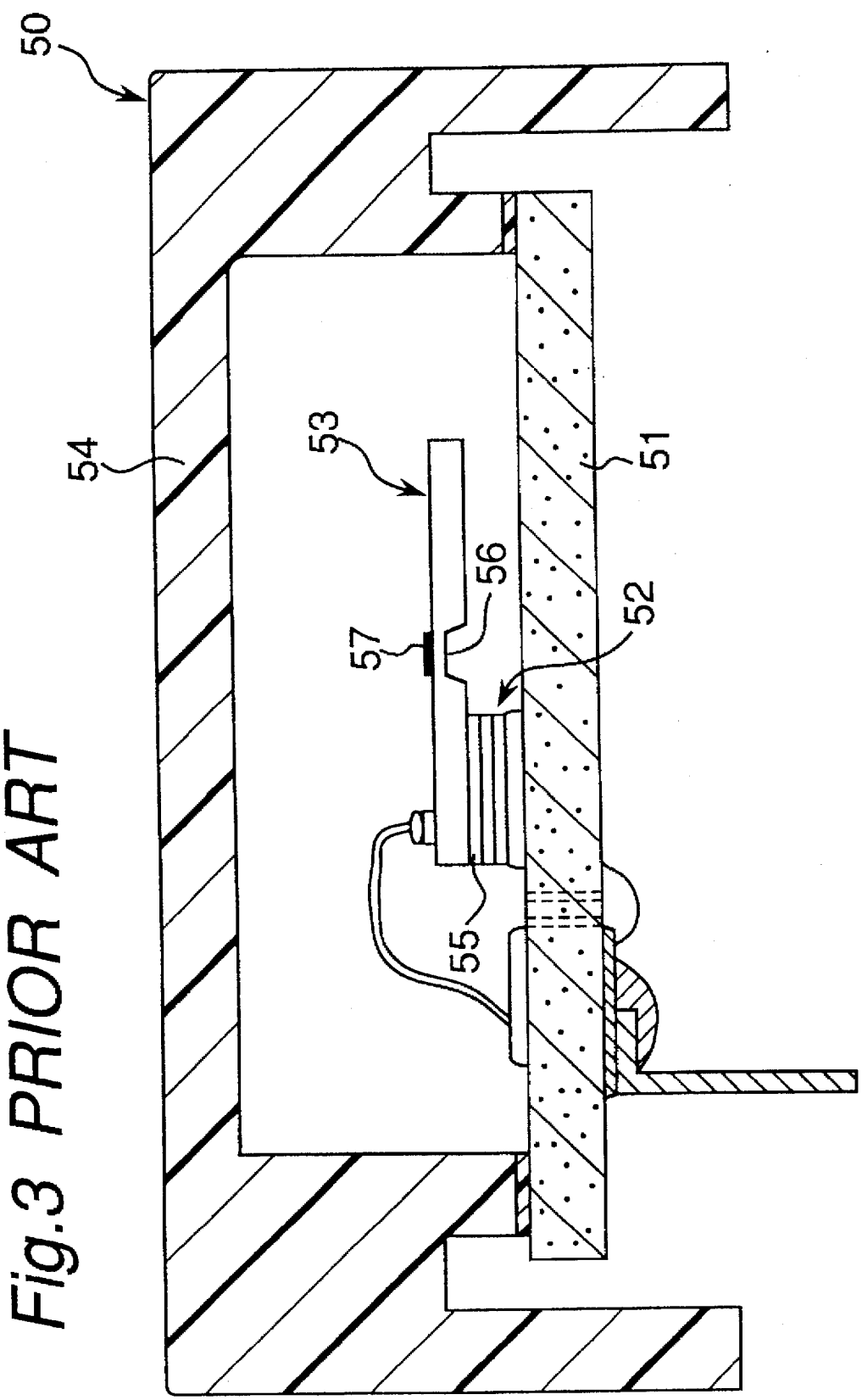
FIG. 3 is a partial cross section showing the internal structure of the conventional semiconductor acceleration sensor.

Next, gold electrode 8 is formed by printing a pattern at a desired place on ceramic substrate 2 with a thick paste made of gold, drying it, and heating it as shown in FIG. 2D. Then, an adhesive made of epoxy resin 30d is applied to the third thick film layer 30c, which is designed to be pedestal 3. Chip placement then occurs on adhesive 30d with one of the ends of sensor chip 4. After die bonding of sensor chip 4 on pedestal 3, adhesive 30d is subjected to heating for curing. Thus pedestal 3, protrusion 7, gold electrode 8, and dam 20 are formed on ceramic substrate 2 and sensor chip 4 is fixed on pedestal 3.

In addition to the above processes, the following processes must be performed before completing a semiconductor acceleration sensor 1: coating the inner wall of through hole 10 with a conductor; forming a thick film conductor 11 of Ag-Pd or Ag-Pt on the nonmounting side of ceramic substrate 12; soldering lead terminal 12 to thick film conductor 11; applying resin 14 to the through hole 10 on the nonmounting side of ceramic substrate 12; and fixing package 15 with adhesive 18 to the mounting side of ceramic substrate 12.

In this embodiment, pedestal 3 comprises thick film layers 30a, 30b, 30c, and 30d, protrusion 7, thick film layers 30a and 30b, and dam 20, and three thick film layers 30a, 30b, and 30c. Therefore, the gap between sensor chip 4 and protrusion 7 is the sum of the thicknesses of third thick film layer 30c and adhesive layer 30d.

Thus, the semiconductor acceleration sensor of Embodiment 1 of the present invention comprises protrusion 7 on ceramic substrate 2 underneath the free end of sensor chip 4. The protrusion limits the deflection of the free end toward ceramic substrate 2 and prevents the breakage of sensor chip 4 at diaphragm 5 even if an excessive impulse acts on semiconductor acceleration sensor 1. Protrusion 7 can be formed at the same time and through the same process as pedestal 3 and dam 20. It means that an additional process for forming protrusion 7 at a precise position with respect to pedestal 3 is not required and that protrusion 7 is formed with only a small extra material cost just underneath the free end of sensor chip 4.

Further, since protrusion 7 includes a plurality of thick films, the gap between sensor chip 4 and protrusion 7 can be controlled accurately and through a wide range by varying the number of the thick film layers relative to the number of thick films for pedestal 3. Therefore, this structure does not limit the deflection of the free end due to dust or a foreign particle between sensor chip 4 and protrusion 7 but allows semiconductor acceleration sensor 1 to provide an accurate measurement of the acceleration acting on the acceleration sensor.

Projecting portion 19 formed on package 15 in the position just above the free end of sensor chip 4 limits the deflection of the free end toward package 15 and prevents the breakage of sensor chip 4 at diaphragm 5 when an excessive impulse acts on semiconductor acceleration sensor 1. Projecting portion 19 can be formed in one piece with package 15 when the package is molded. Therefore, projecting portion 19 can be made with only a small extra material cost and without any additional processes.

EXAMPLE

Next, an example of the semiconductor acceleration sensor of the present invention will be described below.

In FIG. 2 the thickness of ceramic substrate 2 is 0.8 µm; that of first thick film 30a, 10–15 µm; and those of second and third thick films 30b and 30c, 35–45 µm each. The thickness of gold electrode 8 is 10–15 µm and that of adhesive layer 30d is 5 µm. Sensor chip 4 is 6.0 µm in length, 1.5 µm in width, and 250 µm in thickness. The diaphragm is 100 µm in thickness.

In the above example the gap between sensor chip 4 and protrusion 7 is 50 µm, which is the sum of the thicknesses, the third thick film of 45 µm, for example, and of the adhesive layer 30d of 5 µm. Thus, the gap between sensor chip 4 and protrusion 7 is the difference between the height of pedestal 3 and that of protrusion 7 and is determined by the thicknesses of the thick films of pedestal 3 which are not included in protrusion 7.

Although, the present invention has been described in terms of preferred embodiments, it will be apparent to those of skill in the art that numerous variations and modifications may be made without departing from the true spirit and scope thereof, as set forth in the following claims.

What is claimed is:

1. A semiconductor acceleration sensor comprising:
 a substrate,
 a semiconductor sensor chip including a diaphragm and having first and second ends,
 a pedestal disposed on said substrate and including at least one thick film layer on which the first end of said semiconductor sensor chip is mounted thereby forming a cantilever structure, and
 a protrusion disposed on said substrate directly opposite the second end of said semiconductor sensor chip shorter than said pedestal, said protrusion including laminated thick films of an electrically insulating glass and an electrical conductor.

2. The semiconductor acceleration sensor according to claim 1 comprising a resin package covering said semiconductor sensor chip and sealed to said substrate.

3. The semiconductor acceleration sensor according to claim 2 wherein said resin package has a projecting portion directly opposite and spaced from the second end of said semiconductor sensor chip by a gap.

4. The semiconductor acceleration sensor according to claim 3 wherein the gap between said projecting portion and the second end of said semiconductor sensor chip is within a range of 10–100 µm.

5. The semiconductor acceleration sensor according to claim 1 wherein said protrusion is spaced from the second end of said semiconductor sensor chip by a gap within a range of 10–100 µm.

6. A semiconductor acceleration sensor comprising:

a substrate, a semiconductor sensor chip including a diaphragm and having first and second ends, a pedestal disposed on said substrate and including at least one thick film layer on which the first end of said semiconductor sensor chip is mounted thereby forming a cantilever structure, and a protrusion disposed on said substrate directly opposite the second end of said semiconductor sensor chip shorter than said pedestal, said protrusion comprising laminated thick film layers including at least one thick film layer made of the same material as a thick film layer of said pedestal.

7. The semiconductor acceleration sensor according to claim 6 comprising a resin package covering said semiconductor chip and sealed to said substrate.

8. The semiconductor acceleration sensor according to claim 7 wherein said resin package has a projecting portion directly opposite and spaced from the second end of said semiconductor sensor chip by a gap.

9. The semiconductor acceleration sensor according to claim 8 wherein the gap between said projecting portion and the second end of said semiconductor sensor chip is within a range of 10–100 μm.

10. The semiconductor acceleration sensor according to claim 6 wherein said protrusion includes laminated thick films of an electrically insulating glass and an electrical conductor.

11. The semiconductor acceleration sensor according to claim 6 wherein said protrusion is spaced from the second end of said semiconductor sensor chip by a gap within a range of 10–100 μm.

* * * * *